US005858155A

United States Patent [19]

Hill et al.

[11] Patent Number: 5,858,155

[45] Date of Patent: Jan. 12, 1999

[54] METHOD OF FORMING A PERFORATED ADHESIVE ASSEMBLY

[75] Inventors: George R. Hill, Cheshire; William Voss, Buckinghamshire, both of Great Britain

[73] Assignee: Contravision Limited, Cheshire, United Kingdom

[21] Appl. No.: 849,054

[22] PCT Filed: Jan. 2, 1996

[86] PCT No.: PCT/GB96/00002

§ 371 Date: May 29, 1997

§ 102(e) Date: May 29, 1997

[87] PCT Pub. No.: WO96/20840

PCT Pub. Date: Jul. 11, 1996

[30] Foreign Application Priority Data

Dec. 30, 1994 [GB] United Kingdom .................. 9426401

[51] Int. Cl.[6] .......................... B32B 31/18; B32B 31/12; B44F 1/10

[52] U.S. Cl. .......................... 156/230; 156/237; 156/241; 156/248; 156/249; 156/252; 156/253; 156/270; 156/272.8; 156/277; 156/289; 428/41.8

[58] Field of Search .................................... 156/230, 238, 156/240, 241, 248, 249, 252, 253, 270, 272.8, 237, 277, 289; 428/41.8, 137, 138

[56] References Cited

U.S. PATENT DOCUMENTS

| | | | |
|---|---|---|---|
| 4,261,649 | 4/1981 | Richard . | |
| 4,358,488 | 11/1982 | Dunklin et al. . | |
| 4,673,609 | 6/1987 | Hill . | |
| 4,851,166 | 7/1989 | Kendall . | |
| 4,883,556 | 11/1989 | Leavitt, Sr. et al. . | |
| 4,940,622 | 7/1990 | Leavitt, Sr. et al. . | |
| 4,955,709 | 9/1990 | Smith . | |
| 4,960,482 | 10/1990 | Crane et al. | 156/249 X |
| 5,201,976 | 4/1993 | Eastin | 156/249 X |
| 5,330,232 | 7/1994 | Smith . | |
| 5,391,249 | 2/1995 | Senft | 156/248 |
| 5,421,933 | 6/1995 | Nedblake et al. | 156/272.8 X |
| 5,525,177 | 6/1996 | Ross . | |
| 5,550,346 | 8/1996 | Andriash et al. . | |
| 5,609,938 | 3/1997 | Shields . | |
| 5,665,446 | 9/1997 | Sundet | 428/41.8 X |
| 5,679,435 | 10/1997 | Andriash . | |

FOREIGN PATENT DOCUMENTS

| | | |
|---|---|---|
| 628 426 | 5/1991 | Australia . |
| 2 693 950 | 1/1994 | France . |
| 44 05 946 | 6/1995 | Germany . |
| 51-86049 | 7/1976 | Japan . |
| 54-93255 | 1/1979 | Japan . |
| 1 299 910 | 12/1972 | United Kingdom . |
| 2 088 613 | 6/1982 | United Kingdom . |
| 2 118 096 | 10/1983 | United Kingdom . |
| 2 244 585 | 12/1991 | United Kingdom . |
| 95 23034 | 8/1995 | WIPO . |

OTHER PUBLICATIONS

Gila River Products, Inc. "Gila Automotive Products", no date (at least 1982), Chandler, Arizona, USA.

Shadow Screen Co., Inc., "Shadow Screens", 1979 Catalog, Phoenix, Arizona, USA.

"American Scenics" Brochure, 1978.

*Primary Examiner*—Curtis Mayes

*Attorney, Agent, or Firm*—Pillsbury, Madison & Sutro Cushman Darby & Cushman Intellectual Property Group

[57] ABSTRACT

A method of forming a partially perforated assembly comprising a perforated facestock material, an unperforated liner, and a self-adhesive adhering the perforated facestock material to the unperforated liner, the method comprising forming a temporary assembly including the perforated facestock material, the self-adhesive, and a temporary carrier adhered to the perforated facestock material by the self-adhesive, the perforated facestock material having been perforated by material removal of portions of the facestock material, removing the temporary carrier from its adhered relation to the perforated facestock material, and after the removing, adhering the unperforated liner to the perforated facestock material by the self-adhesive to form the partially perforated assembly.

48 Claims, 5 Drawing Sheets

14 14 14 12 2 4

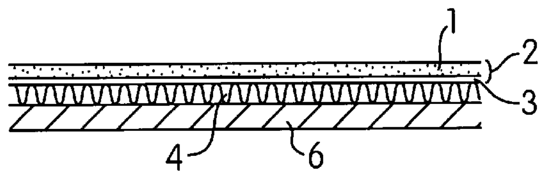
FIG. 3A
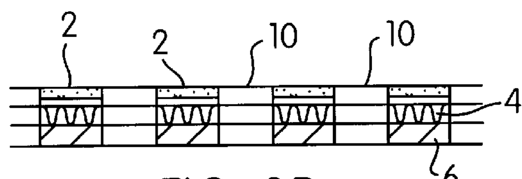
FIG. 3B
FIG. 3C
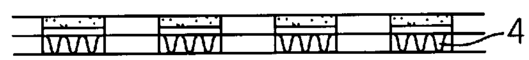
FIG. 3D
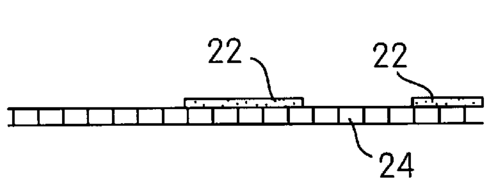
FIG. 3X
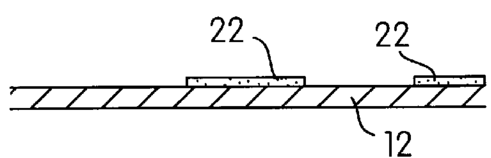
FIG. 3Y
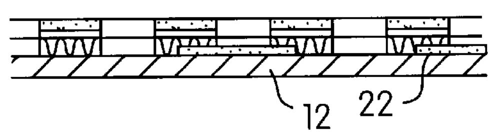
FIG. 3Z
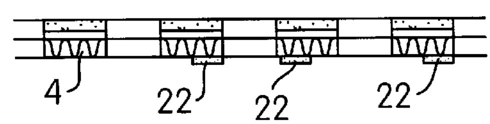
FIG. 3E
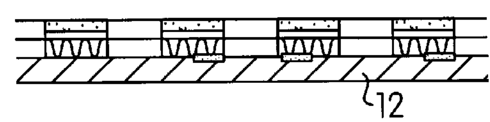
FIG. 3F
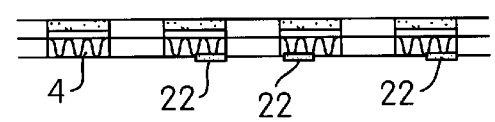
FIG. 3G
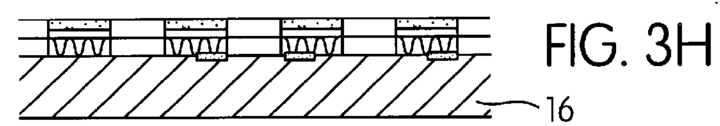
FIG. 3H

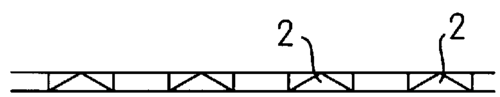
FIG. 4A
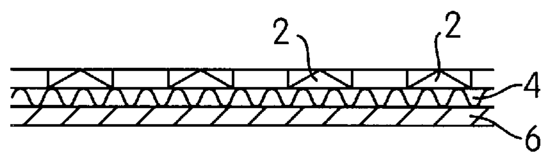
FIG. 4B
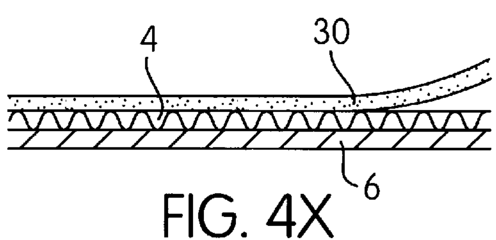
FIG. 4X
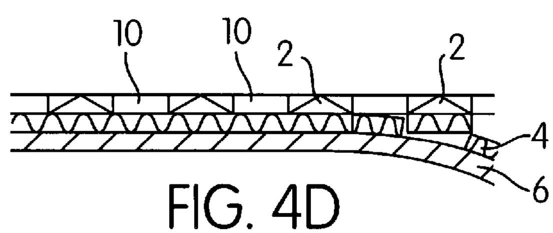
FIG. 4C
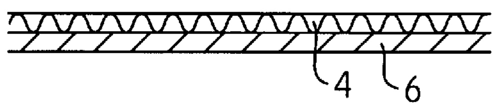
FIG. 4D
FIG. 4Y
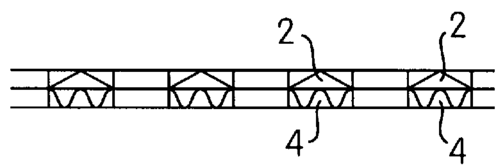
FIG. 4E
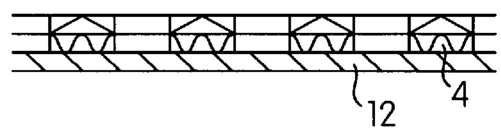
FIG. 4F

METHOD OF FORMING A PERFORATED ADHESIVE ASSEMBLY

This application is the national phase of international application PCT/GB96/00002, filed Jan. 2, 1996 which was designated the U.S.

This invention relates to a perforated adhesive assembly.

Perforated self-adhesive films have a variety of uses, including providing a-solar shading device when applied to windows. Perforated self-adhesive film may also be provided with a design applied to one side which is not visible from the other side, as described in British Patent No.2165292 and corresponding U.S. Pat. No. 4,673,609. These patents disclose an embodiment in the form of a perforated film or other material, sometimes referred to as a perforated "facestock", a layer of perforated self-adhesive, sometimes referred to as a pressure-sensitive adhesive and a perforated protective film to the adhesive, sometimes referred to as a perforated "liner". The perforated protective film or liner is removed to expose the adhesive prior to application of the perforated facestock to a window or other surface.

The problem with these perforated assemblies is that if paint or ink is sprayed onto the facestock there is nothing to stop the paint or ink from penetrating the perforations leading to the presence of paint or ink where it is not wanted and thus producing a very poor finished product. Further if such a perforated assembly is printed on a vacuum bed, such as is commonly used with screen printing machines, the perforations prevent the perforated material from being held down on the printing bed by vacuum. Moreover the application of the vacuum to the underside of the perforated assembly can positively suck ink through the holes in the perforated material which, as already stated, is undesirable and can also suck ink into the vacuum system itself with very damaging results.

GB-A-224 4585 to Akers discloses a perforated self-adhesive assembly comprising a clear perforated film which is typically printed with a design, a self-cling or self-adhesive layer and a window or other base material. The self-cling or self-adhesive layer may be protected by a peel off backing paper or card, before being applied to the window or other base material.

FR-A-2693950 to Gautreneau discloses a perforated paper with an unperforated backing sheet of paper which is typically connected at only one edge of the perforated paper. The unperforated backing sheet overcomes problems of printing a perforated paper sheet.

Perforated self-adhesive assemblies comprising perforated facestock, a perforated adhesive and an opaque perforated paper liner with an additional unperforated liner have been used in the USA. Typically, the additional unperforated self-adhesive plastic film was adhered to the perforated liner, as a means of overcoming printing problems. Also, a design was typically printed on the perforated facestock to form the product for sale. The perforated liner and the additional unperforated liner were removed together and the imaged perforated facestock adhered to a window by means of the perforated adhesive layer. Such products are believed to have been manufactured by Visual Technologies, Inc. of Pineville, N.C. USA and placed in the public domain not later than September 1993.

Typically in such products, the design was printed "verso" facing a clear perforated facestock and the build-up of applied colouring matter during imaging the design and the finished design were not visible until removal of the opaque perforated paper liner and additional unperforated liner. Thus, the printer or customer could not inspect a product before installation without removing the opaque perforated paper liner and additional unperforated liner, thus amaging the produce for any Subsequent use.

The present invention has been made in order to overcome these problems and provide additional benefits.

According to the invention a method of forming a partially perforated assembly comprising a perforated facestock material, a self-adhesive attached on one side thereof to said perforated facestock material and an unperforated liner having a release surface, said release surface of said unperforated liner being attached to the other side of said self-adhesive, said method being characterised by the steps of forming a temporary assembly comprising said perforated facestock material, said self-adhesive and a temporary carrier attached to said other side of said self-adhesive, removing said temporary carrier and applying said release surface of said unperforated liner to said other side of said self-adhesive.

The invention also provides a method of forming a partially perforated assembly comprising a perforated facestock material, a self-adhesive attached on one side thereof to said perforated facestock material and a base material attached to the other side of said self-adhesive, said method being characterised by the steps of forming a temporary assembly comprising said perforated facestock material, said self-adhesive and a temporary carrier attached to said other side of said self-adhesive, removing said temporary carrier and applying an unperforated liner to said other side of said self-adhesive, removing the liner and applying said perforated facestock material and said self-adhesive to said base material.

The invention further provides a method of forming a partially perforated assembly comprising a perforated facestock material, a perforated self-adhesive attached on one side thereof to said perforated facestock material and an unperforated liner attached to the other side of said self-adhesive, said method being characterised by the steps of forming a temporary assembly comprising a facestock material, a self-adhesive and a temporary carrier attached to said other side of said self-adhesive, perforating said facestock material and said self-adhesive and said temporary carrier simultaneously, removing said temporary carrier and applying said unperforated liner to said other side of said self-adhesive.

In addition the invention provides a method of forming a partially perforated assembly comprising a perforated facestock material, a self-adhesive attached on one side thereof to said perforated facestock material and an unperforated release liner, said method being characterised by the steps of forming a temporary assembly comprising said perforated facestock material, said self-adhesive and a temporary carrier attached to said other side of said self-adhesive, removing said temporary carrier, wherein parts of said self-adhesive are adhered to said temporary carrier and are removed from said assembly by removing said temporary carrier, and applying said unperforated liner to said other side of said self-adhesive.

The perforation of an assembly of facestock, adhesive and carrier is not at all easy because in general such assemblies are pliable and may tend to yield rather than be perforated. In addition, perforation simultaneously of a plurality of layers of different materials is also difficult. With the invention, however, the role of the carrier is temporary and it can be chosen with a view to facilitating the perforation of the assembly. In contrast, the role of the imperforate liner is primarily to protect the adhesive prior to application of the facestock to a base material such as a window. Thus the material of the imperforate liner can be selected for its suitability for its role, that is to say, thickness, weight and effectiveness of release coating and without ary regard to the ability to perforate it in combination with the facestock and adhesive.

Secondly, it should be of a thickness and stiffness which, combined with the facestock and adhesive, facilitate manual and mechanical handling of the assembly throughout the distribution, any imaging and the application processes.

Yet another advantage arises from the invention if the perforated facestock is transparent. A design can be applied directly against and facing the transparent facestock, on the surface remote from the self-adhesive, so that the facestock can be applied to the inside of a glass window in order to protect the design from the weather and vandalism but still enabling a design to be visible from outside a building or vehicle. During the printing of such assemblies, it is advantageous if the liner and the self-adhesive are transparent, to enable the design to be visible as it is "built up" of different colours during a printing, spraying or other imaging process. A temporary carrier suitable for perforation, such as a siliconised paper or card material, may be removed and replaced by a transparent plastic film liner, such as transparent silicone coated polyester, which is a relatively difficult material to perforate but is ideal for seeing the design develop during printing. Such siliconised filmic liners have superior "lay flat" characteristics. The use of filmic siliconised liners also assists the transparency of pressure sensitive adhesives allowing the adhesive to "wet out" or flow more readily against the smooth plastic surface of filmic liners compared with the imperfect, irregular surface of siliconised paper liners. A siliconised film liner also maintains the pressure sensitive adhesive in a disposition that is more perfectly plane. This provides greater clarity of visibility of any design when the assembly is applied to a transparent base material such as a window than is the case when using conventional siliconised paper or card liners which tend to have relatively irregular surfaces and to "wet out" less effectively, and thereby lead to the formation of minute air inclusions between the adhesive and the transparent base material to which the assembly is applied. Such air inclusions detract from the quality of perceived image of a design after the product is applied to a window giving a somewhat hazy appearance. There is also a marketing benefit, because the customer or contractor applying the assembly to windows can see the design on opening a consignment of products, prior to application, which would otherwise be obscured by an opaque liner. The design, colours, overall effect and quality of printing can be checked before use.

In a further embodiment of the invention the temporary carrier need not be perforated but still assist the perforation of the facestock material and, optionally, the perforation of the self-adhesive, by providing a temporary restraint to the self-adhesive which would otherwise be likely to be unduly distorted when it is perforated. For example, any attempt to perforate a facestock material and a layer of self-adhesive by conventional means, such as mechanical punching and without a restraining temporary carrier, would be likely to lead to delamination of the self-adhesive layer from the facestock material around each hole and/or to distortion of the self-adhesive around each hole, resulting from squeezing and/or pulling, by the punching tool as it is moved through the material to be perforated and withdrawn. This distortion would cause some of the self-adhesive to remain inside the desired holes following perforation. Such self-adhesive remnants would severely distort vision through the finished product owing to the lens effect of such distorted self-adhesive, which is typically transparent. The restraining temporary carrier enables the self-adhesive to remain in its desired position, to retain its desired thickness and at the same time ensures that the material is punched relatively cleanly, leaving the holes substantially clear of self-adhesive remnants.

A temporary assembly may conveniently be made in a conventional pressure-sensitive adhesive coating and laminating plant. The facestock material may be, for example, a plastic film such as polyethylene or polypropylene or polyvinylchloride film which may be cast, calendered or blown by conventional means. The facestock material may have a thickness of from $50\mu$ to $300\mu$. A typical assembly may comprise a $200\mu$ thick water clear cast polyvinylchloride film applied to the self-adhesive coated liner, the self-adhesive being a layer of water-clear, pressure-sensitive, acrylic adhesive and the temporary carrier being typically a $150\mu$ silicone coated paper. This assembly is mechanically punched with a pattern of holes of typically 1.5 mm diameter in a 60° triangulated layout to provide typically 50% holes and 50% opaque material remaining following perforation. The perforation pattern may be different for different products. The hole diameter may be from say 1 mm to 3 mm diameter. The layout of holes may be on square pattern or other arrangement. The percentage opacity may typically be from 45% to 90% and the percentage of perforations of from 55% to 10% respectively. The perforated temporary carrier is then delaminated and a water-clear silicone coated polyester, unperforated release liner is adhered to the self-adhesive layer in the same sequential process, to form a partially perforated assembly, which is passed between nip rollers to form the self-adhesive in a more perfectly plane configuration against the silicone coated side of the unperforated release liner. The release liner may be of a thickness ranging for example from $50\mu$ to $200\mu$, the particular thickness being chosen in accordance with the desired handling characteristics of the partially perforated assembly.

The partially perforated assembly can then be imaged with a design printed onto and facing the exposed surface of the transparent perforated facestock. For example, the design can be reverse screen printed, to be followed by typically screen printing two layers of white ink and one layer of black ink. The white layers provide a background to the design ink and the black layer provides a surface which assists through vision. A screen printing machine typically includes a suction bed to hold the substrate firmly in place and flat during printing, which can operate with the unperforated liner in place. If required, the black ink layer is then protected with a protective film, for example $25\mu$ thick polyester film applied by means of a layer of water-clear, pressure-sensitive, acrylic adhesive. This additional protective film is conveniently added following the removal of a temporary liner from a protective film self-adhesive assembly, for example by a conventional cold laminating machine which is a common item of machinery in screen printing workshops. The protective film not only protects the screen printing ink but also prevents dirt entering the perforations, which would otherwise detract from the appearance and optical performance of vision through the finished product. If the product is to be used externally, such a protective film is also useful in preventing water entering the perforations. Water in the perforations forms a meniscus which is, in effect, a lens. Such lenses can distort through vision through the assembly. This total assembly permits the printed design to be visible through the transparent perforated facestock, the self-adhesive and the unperforated liner.

In use, the unperforated liner is removed and the imaged perforated facestock, the self-adhesive and, if present, the self-adhesive protective film are applied to a surface such as a window or other transparent panel. In a typical completed configuration, the design is visible through the glass window, the self-adhesive and the transparent, perforated, facestock onto which it is applied. From the other side of the window, the black screen printed ink layer allows relatively clear vision through the window, giving the impression of a moderately tinted window. From a distance, the included holes and surrounding opaque area cannot be resolved by the eye. The invention thus forms an improvement to perforated one-way vision control materials.

In addition to screen printing other methods of design imaging which may be used include offset litho printing, gravure printing, electronic imaging, for example using electrostatic or ink jet systems, transfer from a carrier layer such as hot foil stamping and air brushing.

As an alternative, the first printed design and layers of white ink can be overprinted with a second design facing in the opposite direction to the first design.

The perforated facestock may be treated by applying a design and/or an applied layer before or after perforation and the self-adhesive layer may be applied to such a treated surface of the perforated facestock or to an untreated surface of the perforated facestock. For example, the design can be applied to a surface of the facestock prior to forming the temporary assembly, either on the surface which is intended to be remote from the self-adhesive, or on the surface to which the adhesive is to be applied. In either of these two cases the design may be applied to a white facestock surface and the facestock may be of two layers, for example white and black laminated plastic films such as polyester and/or polyvinylchloride film, or the black layer can be a layer of marking material applied before or after the design is applied to the white surface. The facestock will be transparent, of course, if a design is reverse printed against it, on either side, to be visible through the facestock from the other side of the facestock.

In another embodiment the design is not applied to the perforated facestock, but is applied to the self-adhesive, typically by transfer from a carrier membrane, for example a silicone coated polyester or other plastic film with a low energy surface. The ink may be reverse printed by a four colour process such as screen printing, offset litho printing or an electronic imaging system onto a carrier. The gaps between ink deposits, or the ink, or the dye, allow sufficient residual adhesive tack to affix the facestock to a window or other transparent panel, the design being preferably visible through the glass window. Typically either the self-adhesive is water-clear with a facestock of white and black layers, for example laminated white and black plastic film of polyester and/or polyvinylchloride, or the self-adhesive is coloured white and the facestock is black plastic film. Alternatively, if the design faces the self-adhesive, both the self-adhesive and the perforated facestock are transparent to allow the design to be seen through them. All the embodiments with a design applied to the self-adhesive provide protection to both sides of the design after the facestock has been applied to a window or other base material. In a preferred embodiment the carrier for the printed design also forms the unperforated liner in the partially perforated assembly, such that when the unperforated liner is removed from the assembly, the design is released from the carrier, i.e. the unperforated liner and remains on the self-adhesive in the completed configuration. The resulting product can then be applied to a window or other surface. The design may be printed on the unperforated liner before it is applied to the self-adhesive, or after it has been applied and subsequently delaminated by a printer, for example by use of a "turn bar" in web, roll to roll printing equipment. After printing on the unperforated liner, the printed unperforated liner is re-laminated to the assembly in a re-laminating unit.

In another embodiment , as illustrated in FIGS. 5A to 5E removal of the temporary carrier also removes part of the self-adhesive adhered to it and, optionally, parts of the facestock material that have been cut and are intended to be removed to form the desired perforated facestock and perforated self-adhesive prior to the application of the unperforated liner.

The facestock material and, optionally, the self-adhesive and temporary carrier may be perforated, for example, by mechanical punching, by laser or other means of cutting or by burning. The temperature of the materials being perforated may be reduced or increased from ambient temperatures to assist such perforation, including the option of reducing the temperature of the materials being perforated below the freezing point of water, known as cryogenic techniques. The perforation of the facestock material and self-adhesive may take place simultaneously with the perforation of the temporary carrier.

A layer of material may be applied to the facestock to act as a background to a design. Alternatively such a layer may serve as a receptor coating to assist the adhesion of a design, as a protection to a design or for any other function and may be opaque, transparent or translucent. Such layer or layers and/or any designs may be applied after perforation or before perforation of the facestock.

An unperforated protective self-adhesive film or otherwise attached layer may also be applied over the facestock and over any applied design or other layer. The unperforated liner has a further advantage of preventing dirt entering the perforations and adhering to the self-adhesive surface of such a protective self-adhesive film, prior to the application of the perforated facestock and protective self-adhesive film to a base material.

In yet another embodiment of the invention, the facestock material may be first perforated and an unperforated self-adhesive applied to the perforated facestock material by means of a temporary carrier on which the self-adhesive is deposited. The adhesive tack of the self-adhesive to the temporary carrier is less than the adhesive tack of the self-adhesive to the facestock but is sufficient to cause the self-adhesive to rupture around the boundaries of the perforations in the perforated facestock, such that the self-adhesive is perforated in substantially the same positions as the perforated facestock when the temporary carrier is removed, leaving the perforated self-adhesive attached to the perforated facestock. The unperforated liner is then applied to form the assembly of the invention.

This method may be undertaken by a manufacturer of self-adhesive assemblies for sale to customers to use or to image before use. Alternatively, it can be undertaken by printers or other imagers of a perforated facestock, by means of transfer tape. The term transfer tape conventionally means a layer. of self-adhesive material sandwiched between two liners, a first liner having an easier release from the self-adhesive than the second liner. As used in the invention, the first liner is removed and the self-adhesive layer applied to the perforated facestock and the second liner is pulled away, bringing with it the adhesive not adhered to the perforated facestock, that is to say substantially removing self-adhesive from the areas of the individual perforations in the perforated facestock.

Specific embodiments of the invention will now be described by way of example with reference to the accompanying figures in which similar parts of different embodiments have been given the same reference numerals and in which:

FIGS. 1A to 1H illustrate a sequence of manufacture of such perforated self-adhesive assemblies and application thereof to a window or other surface; more particularly FIGS. 1A to 1H are cross-sections through a perforated self-adhesive assembly consisting of a facestock :material 2, a self-adhesive layer 4 and a temporary carrier 6;

FIG. 1B illustrates a self-adhesive assembly which has been perforated with holes 10;

In FIG. 1C the perforated temporary carrier 6 is being removed from the perforated self-adhesive layer 4;

FIG. 1D illustrates the perforated facestock 2 and perforated adhesive layer 4 with the temporary perforated carrier 6 having been totally removed;

In FIG. 1E a replacement unperforated liner 12 has been applied to the perforated self-adhesive layer 4;

In FIG. 1F a design 14 has been applied to the perforated facestock 2;

In FIG. 1G the replacement unperforated liner 12 has been removed to enable, in FIG. 1H, the application of the perforated facestock 2 with design 14, by means of the perforated self-adhesive layer 4 to a base material 16, such as a glass window;

FIG. 2A–2C are cross-sections through a perforated self-adhesive assembly with an unperforated replacement liner with an image applied to the perforated facestock; more particularly In FIG. 2A at least one opaque or transparent layer 16 is applied to the perforated facestock and a design 18 is applied to the layer 16;

In FIG. 2B a design 20 is applied to a transparent perforated facestock 2 and at least one opaque or transparent layer 16 is applied over the design 20 and other parts of the perforated facestock;

In FIG. 2C a design 20 is applied to a transparent facestock 2; at least one opaque or transparent layer 16 and a design 18 is applied to the layer 16;

FIGS. 3A–3H and 3X–3Z illustrate the sequence of manufacture of such perforated self-adhesive assemblies in which a design is applied to the self-adhesive before being applied to a window or other surface; more particularly FIGS. 3A to 3D are similar to FIGS. 1A to 1D except that the facestock material 2 comprises a laminate of black film 1 with white film 3;

FIG. 3X shows a design 22 applied to a carrier membrane 24;

FIG. 3E shows design 22 applied to self-adhesive layer 4 by transfer from carrier membrane 24;

In FIG. 3F a replacement unperforated liner 12 has been applied to the perforated self-adhesive layer 4 and design 22;

In FIG. 3G the replacement unperforated liner 12 has been removed to enable, in FIG. 3H, the application of the perforated facestock 2 with design 22, by means of the perforated self-adhesive layer 4 to a base material 16, such as a glass window;

FIGS. 3Y and 3Z illustrate a variation of the method shown in FIGS. 3A to 3H;

In FIG. 3Y design 22 is applied to replacement unperforated liner 12;

In FIG. 3Z the replacement unperforated liner 12 with design 22 is attached to the temporary assembly with temporary carrier removed as illustrated in FIG. 3D. When the unperforated liner 12 is subsequently removed, design 22 is transferred from the replacement unperforated liner 12 to the adhesive 4, as illustrated in FIG. 3G, and the perforated facestock 2, the perforated self-adhesive 4 and applied design 22 may then be attached to the base material 16, as illustrated in FIG. 3H;

FIGS. 4A–4F and 4X–4Y illustrate a sequence of manufacture of perforated self-adhesive assemblies in which unwanted adhesive is removed from a continuous layer by means of a temporary carrier;

FIG. 4A illustrates a facestock material;

FIG. 4B shows a perforated facestock material;

FIG. 4X illustrates a transfer tape with a removable first liner 30;

Figure 1A:
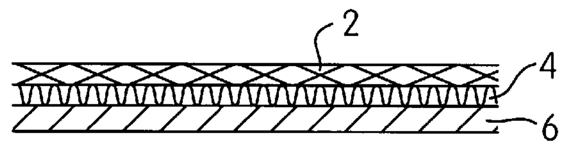
Figure 1B:
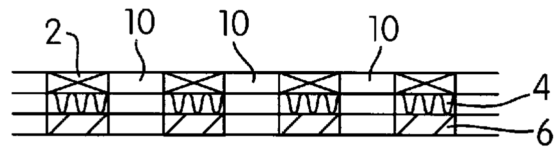
Figure 1C:
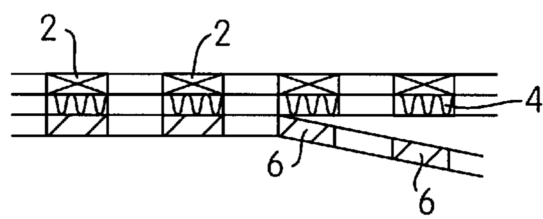
Figure 1D:
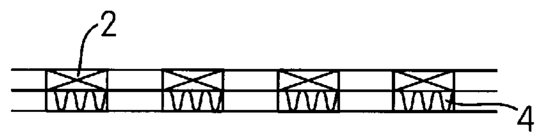
Figure 1E:
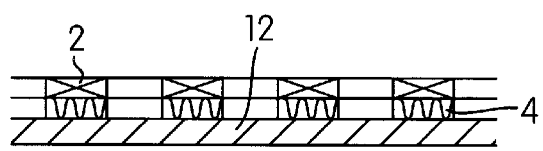
Figure 1F:
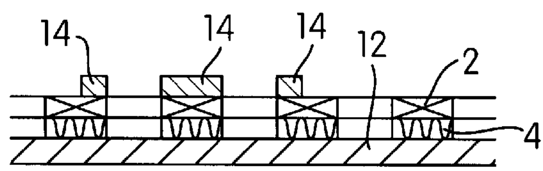
Figure 1G:
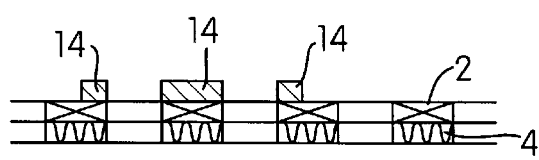
Figure 1H:
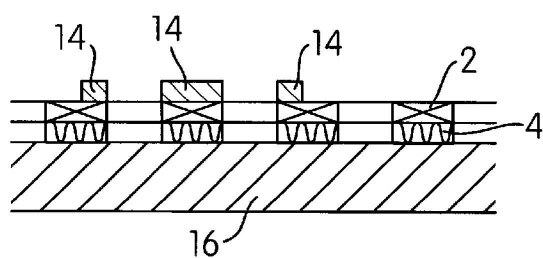
Figure 2A:
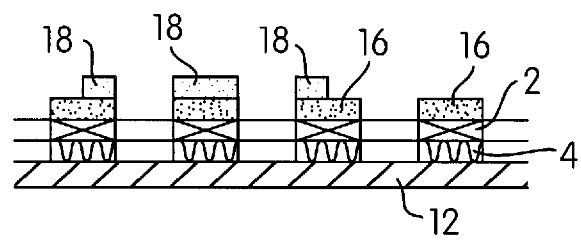
Figure 2B:
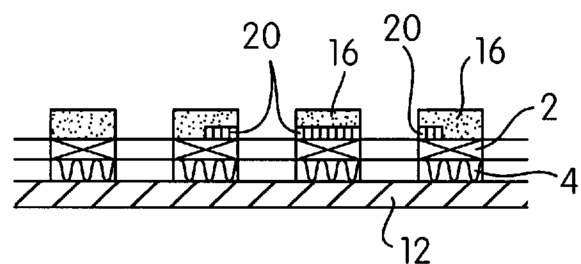
Figure 2C:
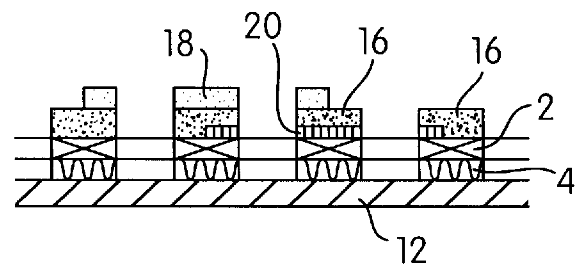
Figure 5A:
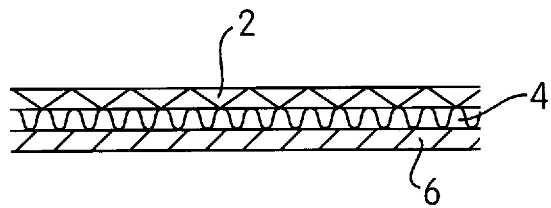
Figure 5B:
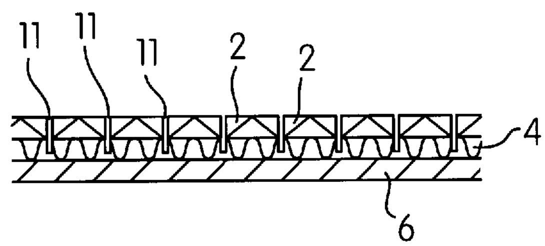
Figure 5C:
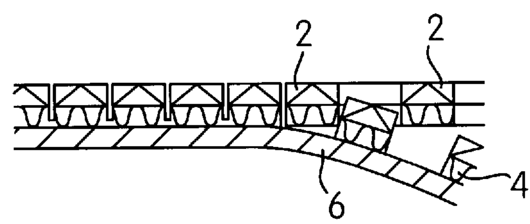
Figure 5D:
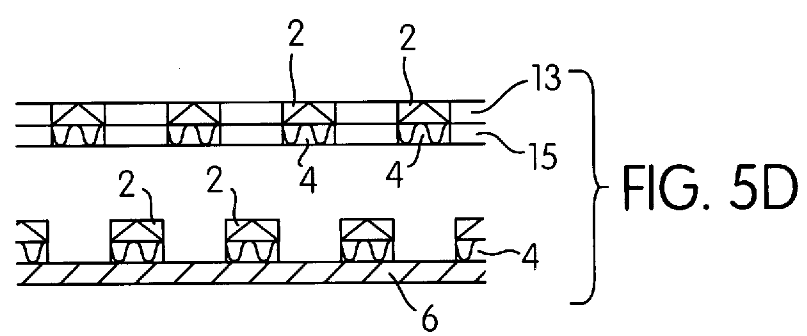
Figure 5E:
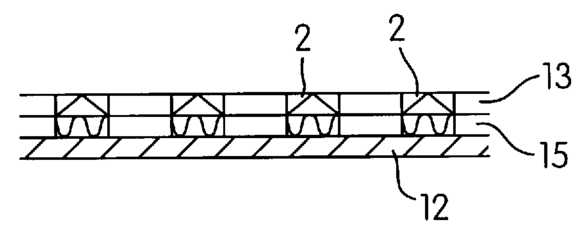

FIG. 4Y shows the tape of FIG. 4X after removal of liner 30, temporary carrier 6 and self-adhesive layer 4 being ready for application to perforated facestock 2 to achieve the assembly of FIG. 4C;

FIG. 4C illustrates temporary carrier 6 with a continuous layer of self-adhesive 4 applied to it;

FIG. 4D illustrates the temporary carrier 6 being removed and bringing away with it adhesive in the hole positions 10 which is not directly adhered to the perforated facestock;

FIG. 4E shows the temporary assembly with temporary carrier 6 removed;

FIG. 4F shows replacement unperforated liner 12 attached to self-adhesive 4;

FIG. 5A is a cross-section through a facestock material 2, and adhesive layer 4, and a temporary carrier 6;

FIG. 5B is a cross-sectional view similar to FIG. 5A, but showing laser cuts 11 having been formed into the facestock material 2 and adhesive 4;

FIGS. 5C and 5D are cross-sectional views illustrating that the removal of the temporary carrier 6 also removes parts of the self-adhesive 4 adhered to it and parts of the facestock material 2 that have been laser cut in FIG. 5B and are intended to be removed from the desired perforated facestock 13 and perforated self-adhesive 15 in FIG. 5D, prior to the application of the unperforated liner 12 in 5E;

FIG. 5E illustrates the perforated facestock 13 and perforated self-adhesive 15 applied to the unperforated liner 12.

We claim:

1. A method of forming a partially perforated assembly comprising a perforated facestock material, an unperforated liner having a release surface, and a self-adhesive adhering said perforated facestock material to said release surface of said unperforated liner, said method comprising:

forming a temporary assembly including said perforated facestock material, said self-adhesive, and a temporary carrier adhered to said perforated facestock material by said self-adhesive, said perforated facestock material of said temporary assembly having been perforated by material removal of portions of the facestock material, removing said temporary carrier from its adhered relation to said perforated facestock material, and after said removing, adhering said release surface of said unperforated liner to said perforated facestock material by said self-adhesive to form said partially perforated assembly.

2. A method as claimed in claim1, wherein said material removal is performed by mechanical punching.

3. A method as claimed in claim 1, wherein said material removal is performed by burning.

4. A method as claimed in claim 1, wherein said facestock is perforated while the temperature of said facestock material is below the freezing point of water.

5. A method as claimed in claim 1, wherein said perforated facestock material is transparent.

6. A method as claimed in claim 1, wherein said perforated facestock comprises a white layer and a black layer.

7. A method as claimed in claim 1, wherein said perforated facestock material is black.

8. A method as claimed in claim 1, wherein said unperforated liner is transparent.

9. A method as claimed in claim 1, wherein said unperforated liner comprises polyester.

10. A method as claimed in claim 1, wherein said unperforated liner comprises silicone coated polyester.

11. A method as claimed in claim 1, wherein said self-adhesive is transparent.

12. A method as claimed in claim 1, wherein said self-adhesive is white.

13. A method as claimed in claim 1, and wherein a design is applied to said facestock material.

14. A method as claimed in claim 13, wherein said perforated facestock material is perforated after the application of said design.

15. A method as claimed in claim 13, wherein said perforated facestock material is perforated before the application of said design.

16. A method as claimed in claim 13, wherein said design on the facestock material is visible through the unperforated liner and the self-adhesive.

17. A method as claimed in claim 13, wherein said design on the facestock material is visible through the perforated facestock.

18. A method as claimed in claim 13, wherein a protective film is applied to a layer on the facestock material.

19. A method as claimed in claim 13, wherein said design is formed by an electrostatic imaging system.

20. A method as claimed in claim 13, wherein said design is formed by an ink jet imaging system.

21. A method as claimed in claim 3, wherein said design is formed by transfer from a carrier.

22. A method as claimed in claim 13, wherein said design is overprinted with layers of white ink and a second design.

23. A method as claimed in claim 1, wherein a design is applied to a surface of said facestock material remote from said self-adhesive.

24. A method as claimed in claim 1, wherein a design is applied to a surface of said facestock material to which said self-adhesive is then applied.

25. A method as claimed in claim 1, wherein a design is applied to said self-adhesive after removal of said temporary carrier.

26. A method as claimed in claim 25, wherein said design is applied by transfer from a carrier membrane.

27. A method as claimed in claim 26, wherein said unperforated liner comprises said carrier membrane.

28. A method as claimed in claim 25, wherein the design is applied to the self-adhesive before adhering the unperforated liner to said perforated facestock material.

29. A method as claimed in claim 25, wherein the unperforated liner is removed from the assembly and said design is applied to the unperforated liner after said removal of the unperforated liner from the assembly.

30. A method as claimed in claim 29, wherein the printed unperforated liner is relaminated to the assembly.

31. A method as claimed in claim 1, wherein an opaque layer is applied to said facestock material.

32. A method as claimed in claim 31, wherein said opaque layer on the facestock material is visible through the unperforated liner and the self-adhesive.

33. A method as claimed in claim 1, wherein a transparent or translucent layer is applied to said facestock material.

34. A method as claimed in claim 33, wherein a design is applied to said transparent layer on the facestock material.

35. A method as claimed in claim 1, wherein a protective film is applied to said perforated facestock material.

36. A method as claimed in claim 1, and wherein said self-adhesive is perforated.

37. A method as claimed in claim 1, wherein the temporary carrier comprises paper or card.

38. A method as claimed in claim 37, wherein said unperforated liner comprises plastic film.

39. A method as claimed in claim 1, wherein said temporary carrier is unperforated.

40. A method as claimed in claim 1, wherein said release surface of said unperforated liner comprises a silicone coating.

41. A method of forming a partially perforated assembly comprising a perforated facestock material, a perforated self-adhesive attached on one side thereof to said perforated facestock material and an unperforated liner attached to the other side of said self-adhesive, said method comprising:

forming a temporary assembly including a facestock material, a self-adhesive, and a temporary carrier attached to said other side of said self-adhesive, perforating said facestock material and said self-adhesive and said temporary carrier simultaneously, and removing said temporary carrier and applying said unperforated liner to said other side of said self-adhesive.

42. A method of forming a partially perforated assembly comprising a perforated facestock material, an unperforated liner, and a self-adhesive adhering said perforated facestock material to said unperforated liner, said method comprising:

forming a temporary assembly including said perforated facestock material, said self-adhesive, and a temporary carrier adhered to said perforated facestock material by said self-adhesive, removing said temporary carrier from its adhered relation to said perforated facestock material, and after said removing, adhering said unperforated liner to said perforated facestock material by said self-adhesive to form said partially perforated assembly, wherein said facestock is perforated by laser cutting.

43. A method of forming a partially perforated assembly including a perforated facestock material, an unperforated liner, and a self-adhesive adhering said perforated facestock material to said unperforated liner, said method comprising:

forming a temporary assembly including said perforated facestock material, said self-adhesives and a temporary carrier adhered to said perforated facestock material by said self-adhesive, said perforated facestock material of said temporary assembly having been perforated by material removal of portions of the facestock material, removing said temporary carrier from its adhered relation to said perforated facestock material, wherein parts of said self-adhesive adhered to said temporary carrier are removed from said assembly by said removing said temporary carrier, and after said removing, adhering said unperforated liner to said perforated facestock material by remaining parts of said self-adhesive.

44. A method as claimed in claim 43, wherein said self-adhesive and said temporary carrier comprise parts of a transfer tape, said transfer tape also comprising a second release liner, said second release liner being removed prior to adhering said self-adhesive to said perforated facestock.

45. A method of forming partially perforated assembly comprising a perforated facestock material having a plurality of holes, an unperforated release liner having a release surface, and said perforated facestock material having a perforated self-adhesive adhering said perforated facestock material to said unperforated release liner, said perforated facestock material and said perforated self-adhesive comprising a perforated one-way vision control material, said method comprising:

forming a temporary assembly including a facestock material having a self-adhesive on a side thereof, and a temporary carrier being adhered to said side of said facestock material by said self-adhesive, using a laser to form a plurality of cuts through said facestock material without cutting through said temporary carrier;

separating said temporary carrier from said facestock material, wherein as a result of said plurality of cuts parts of said facestock material and parts of said self-adhesive adhered to said parts of said facestock material are retained by said temporary carrier and removed from said facestock material upon said separating to thereby form said holes in said facestock material and thus convert said facestock material to said perforated facestock material having said perforated self-adhesive, and after said separating, adhering said perforated facestock material to said release surface of said unperforated liner via said perforated self-adhesive to form said partially perforated assembly, said perforated facestock material and said perforated self-adhesive being removable from said unperforated liner to form said perforated one-way vision control material.

46. A method of forming a partially perforated assembly comprising a perforated facestock material, a base material, and a self-adhesive adhering said perforated facestock material to said base material, said method comprising:

forming a temporary assembly including said perforated facestock material, said self-adhesive and a temporary carrier adhered to said perforated facestock material by said self-adhesive, said perforated facestock material of said temporary assembly having been perforated by material removal of portions of the facestock material, removing said temporary carrier from its adhered relation to said perforated facestock material, and adhering an unperforated liner to said perforated facestock by said self-adhesive, removing the liner from its adhered relation to said perforated facestock material, and adhering said perforated facestock material to said base material by said self-adhesive.

47. A method as claimed in claim 46, wherein said base material is transparent.

48. A method as claimed in claim 46, wherein said base material is window glass.

* * * * *